(12) United States Patent
Juhasz et al.

(10) Patent No.: US 9,459,368 B2
(45) Date of Patent: Oct. 4, 2016

(54) ACQUISITION SYSTEM AND METHOD FOR TOWED ELECTROMAGNETIC SENSOR CABLE AND SOURCE

(71) Applicant: PGS Geophysical AS, Oslo (NO)

(72) Inventors: Andras Robert Juhasz, Stockholm (SE); Gustav Göran Mattias Südow, Solna (SE); Ulf Peter Lindqvist, Segeltorp (SE)

(73) Assignee: PGS Geophysical AS, Oslo (NO)

( * ) Notice: Subject to any disclaimer, the term of this patent is extended or adjusted under 35 U.S.C. 154(b) by 96 days.

(21) Appl. No.: 14/518,233

(22) Filed: Oct. 20, 2014

(65) Prior Publication Data
US 2015/0035537 A1 Feb. 5, 2015

Related U.S. Application Data

(62) Division of application No. 13/467,261, filed on May 9, 2012, now Pat. No. 8,994,378.

(51) Int. Cl.
*G01V 3/08* (2006.01)
(52) U.S. Cl.
CPC ..................................... *G01V 3/083* (2013.01)
(58) Field of Classification Search
None
See application file for complete search history.

(56) References Cited

U.S. PATENT DOCUMENTS

| | | | |
|---|---|---|---|
| 4,008,469 A * | 2/1977 | Chapman | G01S 13/0209 324/337 |
| 4,617,518 A | 10/1986 | Srnka | |
| 7,602,191 B2 | 10/2009 | Davidsson | |
| 7,671,598 B2 | 3/2010 | Ronaess et al. | |
| 8,035,393 B2 | 10/2011 | Tenghamn et al. | |
| 8,098,542 B2 | 1/2012 | Hillesund et al. | |
| 8,131,522 B2 | 3/2012 | Ziolkowski et al. | |
| 2006/0202697 A1 | 9/2006 | Sodal | |
| 2008/0007265 A1 | 1/2008 | Milne et al. | |
| 2009/0085569 A1* | 4/2009 | Lisitsyn | G01V 3/12 324/334 |
| 2011/0141850 A1 | 6/2011 | Scott et al. | |
| 2011/0205839 A1 | 8/2011 | Sudow et al. | |
| 2011/0210741 A1 | 9/2011 | Sudow et al. | |
| 2011/0248718 A1 | 10/2011 | Sudow et al. | |

(Continued)

FOREIGN PATENT DOCUMENTS

| | | |
|---|---|---|
| EP | 2376952 | 6/2010 |
| EP | 2376952 | 10/2011 |

OTHER PUBLICATIONS

Intellectual Property Office Examination Report, Application No. GB1308175.7, mailed Nov. 17, 2015.
United Kingdom Search Report, Mailing Date Nov. 13, 2013, Application No. GB 1308175.7, 3 pages total.

(Continued)

*Primary Examiner* — Paresh Patel
(74) *Attorney, Agent, or Firm* — Conley Rose, P.C.

(57) ABSTRACT

An electromagnetic survey acquisition system includes a sensor cable and a source cable, each deployable in a body of water, and a recording system. The sensor cable includes an electromagnetic sensor thereon. The source cable includes an electromagnetic antenna thereon. The recording system includes a source current generator, a current sensor, and an acquisition controller. The source current generator powers the source cable to emit an electromagnetic field from the antenna. The current sensor is coupled to the source current generator. The acquisition controller interrogates the electromagnetic sensor and the current sensor at selected times in a synchronized fashion.

9 Claims, 6 Drawing Sheets

(56) References Cited

U.S. PATENT DOCUMENTS

| | | |
|---|---|---|
| 2011/0255366 A1 | 10/2011 | Karlsen et al. |
| 2011/0255368 A1 | 10/2011 | Sudow et al. |
| 2011/0260730 A1 | 10/2011 | Sudow et al. |
| 2011/0279120 A1 | 11/2011 | Sudow et al. |
| 2011/0291658 A1 | 12/2011 | Skogman et al. |
| 2011/0292759 A1 | 12/2011 | Sudow et al. |
| 2011/0317514 A1 | 12/2011 | Sudow et al. |
| 2012/0051175 A1 | 3/2012 | Sudow et al. |
| 2012/0134671 A1 | 5/2012 | Edwards et al. |

OTHER PUBLICATIONS

Johan Mattsson, et al. "Error analysis and capability modelling for towed streamer electromagnetics", Aug. 2012, pp. 91-96, EAGE First break vol. 30.

Johan Mattsson, et al. "Towed streamer EM' . the challenges of sensitivity and anisotropy", Jun. 2013, pp. 155-159, EAGE First Break, Jun. 2013, pp. 155-159, vol. 31.

Chris Anderson, et al. An integrated approach to marine electromagnetic surveying using a towed streamer and source, First Break, May 2010, pp. 71-75, EAGE First break, vol. 28.

\* cited by examiner

ACQUISITION SYSTEM AND METHOD FOR TOWED ELECTROMAGNETIC SENSOR CABLE AND SOURCE

CROSS-REFERENCE TO RELATED APPLICATIONS

This application is a divisional of U.S. patent application Ser. No. 13/467,261 filed May 9, 2012 (PGS-10-32US) titled, "Acquisition System and Method for Towed Electromagnetic Sensor Cable and Source", which is incorporated by reference herein as if reproduced in full below.

STATEMENT REGARDING FEDERALLY SPONSORED RESEARCH OR DEVELOPMENT

Not applicable.

BACKGROUND

The invention relates generally to the field of marine electromagnetic surveying. More particularly, the invention relates to towed streamer-type marine electromagnetic surveying and acquisition systems having reduced signal sensitivity to vessel and streamer motion in a body of water.

Marine electromagnetic surveying includes acquisition of electromagnetic signals from formations below the bottom of a body of water using electromagnetic sensor streamers that may be towed by a vessel in the body of water. An electromagnetic energy source may also be towed by the same vessel or by a different vessel.

U.S. Pat. No. 7,671,598 issued to Ronaess et al. describes a system and method for reducing induction noise in a marine electromagnetic survey system resulting from motion of the various sensor streamer components in the water. High quality electromagnetic data acquisition using towed streamer(s) and a towed electromagnetic energy source may require determining noise that may be induced in other components of the acquisition system, such as the tow vessel and/or the electromagnetic energy source as they move along the body of water.

Thus there exists a need for a marine electromagnetic survey system and method that can provide reduced vessel and source motion-induced noise in the acquired signals.

DETAILED DESCRIPTION

Figure 1:
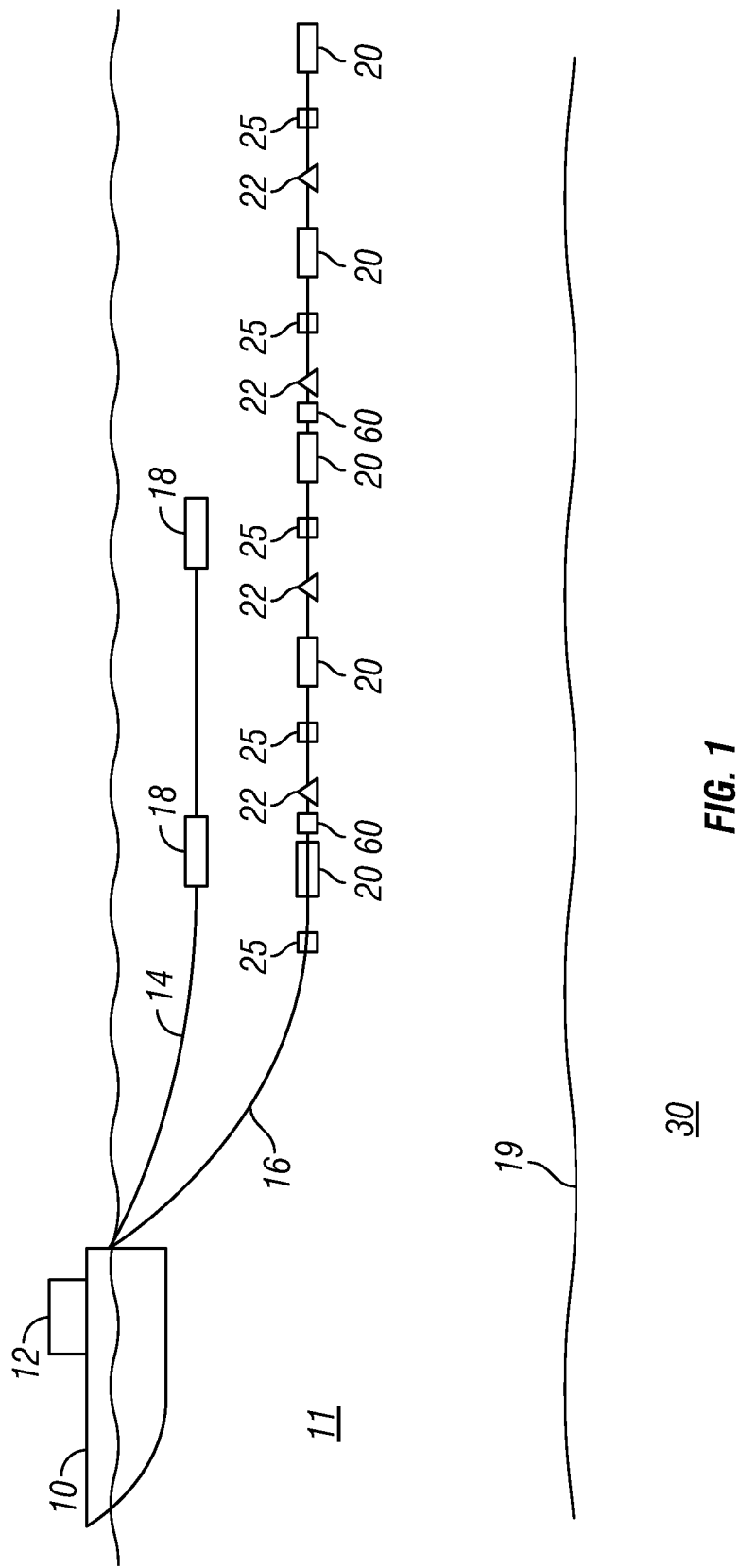
FIG. 1 shows an example embodiment of an acquisition system for marine electromagnetic surveying.

An example embodiment of an acquisition system for marine electromagnetic surveying is shown schematically in FIG. 1. A survey vessel 10 moves along the surface of a body of water 11 such as a lake or an ocean. The survey vessel 10 may include equipment, shown generally at 12 and referred to for convenience as a "recording system" that may comprise devices (none shown separately in FIG. 1) for applying electric current to an antenna such as source electrodes 18 and/or other devices disposed on or along a source cable 14, which may be towed by the survey vessel 10. The recording system 12 may also include equipment (not shown separately in FIG. 1) for navigating the survey vessel 10, for determining the geodetic position of the survey vessel 10 and of components towed by the survey vessel 10 in the body of water 11, and devices for recording signals detected by one or more sensors on one or more sensor cables 16. As shown in FIG. 1, the sensor cable(s) 16 may also be towed by the survey vessel 10. In other embodiments, sensor cable(s) 16 may be towed by another survey vessel (not shown).

The source cable 14 in the present example may include an electromagnetic antenna consisting of two source electrodes 18 disposed at spaced apart positions along the source cable 14. At selected times certain of the equipment (not shown separately in FIG. 1) in the recording system 12 applies electric current across the source electrodes 18. The time varying components of such electric current produce an electromagnetic field that propagates through the body water 11 and into the formations 30 below the water bottom 19. The particular type of current conducted across the source electrodes 18 may be various forms of switched direct current, such used in transient controlled source electromagnetic surveying or types of current used in frequency domain electromagnetic surveying. Non-limiting examples of switched direct current for transient controlled source electromagnetic surveying include switching the current on, switching the current off, reversing current polarity and selected switching sequences such as pseudo-random binary sequences. It is within the scope of the invention, therefore, to perform either or both frequency domain and transient controlled source electromagnetic surveying. It should also be understood that the arrangement of the source electrodes 18 shown in FIG. 1, referred to as a horizontal electric dipole antenna, is not the only type of electromagnetic source antenna that may be used with the invention. The source cable 14 may also include, in addition to or in substitution of the horizontal electric dipole source antenna shown in FIG. 1, any one or more of a vertical electric dipole antenna, and horizontal or vertical magnetic dipole antenna (current loop). Accordingly, the electromagnetic field source antenna configuration shown in FIG. 1 is not intended to limit the scope of the present invention.

In the example embodiment of FIG. 1, the survey vessel 10 may also tow more than one sensor cable 16. A single sensor cable is shown in FIG. 1 only for clarity of the illustration and is not a limit on the scope of the invention. The sensor cable 16 may include at least one electromagnetic sensor 20, and preferably a plurality of such electromagnetic sensors disposed at spaced apart positions along the length of the sensor cable 16. Each of the one or more electromagnetic sensors 20 may measure a parameter related to the electromagnetic field resulting from interaction of the electromagnetic field induced by the source (e.g., source electrodes 18) with the subsurface formations 30 below the water bottom 19. In the present example, the electromagnetic sensors 20 may be pairs of receiver electrodes disposed at spaced apart positions along the sensor cable 16. An electric field component of the electromagnetic field resulting from interaction of the induced electromagnetic field with the formations 30 below the water bottom 19 can induce voltages across each of the pairs of receiver electrodes, and such voltages may be detected by any form of voltage measuring circuit (not shown in the present figure) known in the art. Such voltage measuring circuits (not shown) may be disposed in the sensor cable 16 and/or in the recording system 12.

Another example of an electromagnetic sensor that may be used in other examples is a single axis or multi-axis magnetometer, such as a flux gate magnetometer.

It should be understood that the example electromagnetic survey system of FIG. 1 including only one sensor cable 16 is shown to illustrate how to make and use a sensor cable according to various aspects of the invention. A sensor cable according to the various aspects of the invention may be used with acquisition systems that include a plurality of laterally spaced apart sensors cables towed by the survey vessel 10 and/or by another vessel in a selected configuration to provide "in line" and "cross line" electromagnetic and/or seismic signals. Accordingly, the number of sensor cables and their particular geometric configuration in the water 11 are not limits on the scope of the present invention.

If electrode pairs are used as the electromagnetic sensors 20, such electrode pairs may measure voltages induced by the electromagnetic field generated as a result of the interaction of the induced electromagnetic field with the formations 30 below the water bottom 19. It will be appreciated by those skilled in the art that motion of the survey vessel 10 and motion of the sensor cable(s) 16 through the water 11 may not be uniform. Such non-uniform motion may result from currents in the water and acceleration of the survey vessel 10 (change in velocity or direction) transferred to the sensor cable 16 through towing equipment used to connect the sensor cable 16 to the survey vessel 10. Such non-uniform motion of the sensor cable 16 through the Earth's magnetic field can induce voltages along electrical conductors (not shown) in the sensor cable 16 as well as in the electromagnetic sensors 20. The motion-induced voltages may be calculated or estimated if the motion of sensor cable 16 proximate the electromagnetic sensors 20 is known. In the present example, motion sensors 25 may be disposed at selected positions along the sensor cable 16. In the example of FIG. 1, the motion sensors 25 are each shown as located proximate to one of the electromagnetic sensors 20. The example number of motion sensors 25 and their placement as shown in FIG. 1 are not intended to limit the number of motion sensors or their particular geometric configuration that may be used in other examples of an electromagnetic sensor cable according to the invention. The signals measured by the motion sensors 25 may be detected and processed by certain equipment (not shown in FIG. 1) in the recording system 12, and may be used to estimate magnitude of induced voltages resulting from motion of parts of the sensor cable 16 with respect to the Earth's magnetic field. Such estimates may be used in processing measurements made from the electromagnetic sensors 20 in the sensor cable 16 to reduce the effects of the motion induced voltages on the measurements made by the electromagnetic sensors 20. An example embodiment for using the signals detected by the motion sensors 25 to correct measurements made by the electromagnetic sensors 20 is described in U.S. Pat. No. 7,671,598 issued to Ronaess et al. and incorporated herein by reference.

In some embodiments, similar motion sensors may be included on board the survey vessel 10, for example, in or proximate the recording system 12. A schematic diagram showing an example embodiment of an acquisition system including such additional sensors may be better understood with reference to FIG. 2. The term "acquisition system" as used herein is intended to mean all the components typically used to generate, detect and record electromagnetic survey signals. The acquisition system thus may include the recording system 12, the source cable 14 and at least one sensor cable 16.

The recording system 12 may include a source current generator 48 that may provide one or more types of alternating current or switched direct current as previously explained. A "signature", or amplitude with respect to time of the current provided by the source current generator 48 may be measured by one or more current sensors 40, 42 coupled to an output of the source current generator 48. The current sensors 40, 42 may generate an electrical and/or optical signal corresponding to the current magnitude with respect to time. The recording system 12 may also include a data acquisition controller 50, which may be, for example, a built-to-purpose microcomputer or suitably programmed general purpose microcomputer. The acquisition controller 50 may obtain an absolute time reference signal from, for example, a geodetic position signal receiver 52, such as a GNSS signal receiver. The absolute time reference signal may be used to synchronize signal detection and recording functions, so that signal amplitude of the output of all the sensors in the acquisition system may be recorded with respect to an identical time reference.

The acquisition controller 50 may send an interrogation command signal over a command signal line 54, which may be, for example, one or more insulated electrical conductors, or one or more optical fibers. The interrogation command signal may interact with each of a plurality of acquisition nodes 60 in the sensor cable 16. The acquisition nodes 60 may include circuitry, for example, for detection of voltages impressed across pairs of electrodes or other electromagnetic sensor(s) (e.g., 20 in FIG. 1) and for detection of signals from the motion sensors (25 in FIG. 1). The signals detected by each sensor may be converted by circuits (not shown separately) associated with each acquisition node 60 into a form suitable for transmission to the recording system 12 over a signal return line 55 (FIG. 3). Example circuitry that may be used to convert the detected voltages and motion signals into suitable form for communication, such as optical signals, is described in the Ronaess et al. '598 patent. Conversion of the foregoing detected signals into electrical telemetry signals is also within the scope of the present invention. In the example embodiment in FIG. 2, the command signal line 54 may extend the entire length of the sensor cable 16 and may return to the survey vessel (10 in FIG. 1) and to acquisition controller 50 using the signal return line 56. The signal return line 56 may extend to the one or more sensors disposed on the survey vessel (10 in FIG. 1) such as the current sensors 40, 42, and motion sensors 44, 46. The motion sensors 44, 46 may be similar in configuration to the motion sensors (25 in FIG. 1) in the sensor cable 16. The signals emitted by each of the on board current sensors 40, 42, and motion sensors 44, 46 may be converted to a form, such as optical signals, suitable for transmission to the acquisition controller 50 using the signal return line 56. Signals from the motion sensors 44, 46 on board the survey vessel (10 in FIG. 1) may be used substantially as explained in the Ronaess et al. '598 patent to further reduce motion induced noise in the signals generated by the electromagnetic sensors (20 in FIG. 1) in the sensor cable (16 in FIG. 1).

The acquisition controller 50 may also generate control signals for operation of the source current generator 48. Current from the source current generator 48 may be conducted to the source electrodes 18 in the source cable 14. Signals detected by the various sensors may thereby be precisely synchronized. For example, by having the acquisition controller 50 operate both signal generation through control of the source current generator 48 and detection of signals from the various sensors and acquisition nodes by sending an interrogation signal to each acquisition node 60 and on board current sensors 40, 42, the source current may be synchronized with signals from the acquisition nodes. Acquisition controller 50 may also detect signals from motion sensors 44, 46, allowing the signals detected by the motion sensors to be precisely synchronized with the source current. In other example embodiments, the acquisition controller 50 may only provide control signals to synchronously interrogate the on board current sensors 40, 42, and motion sensors 44, 46 and each acquisition node 60.

Figure 2:
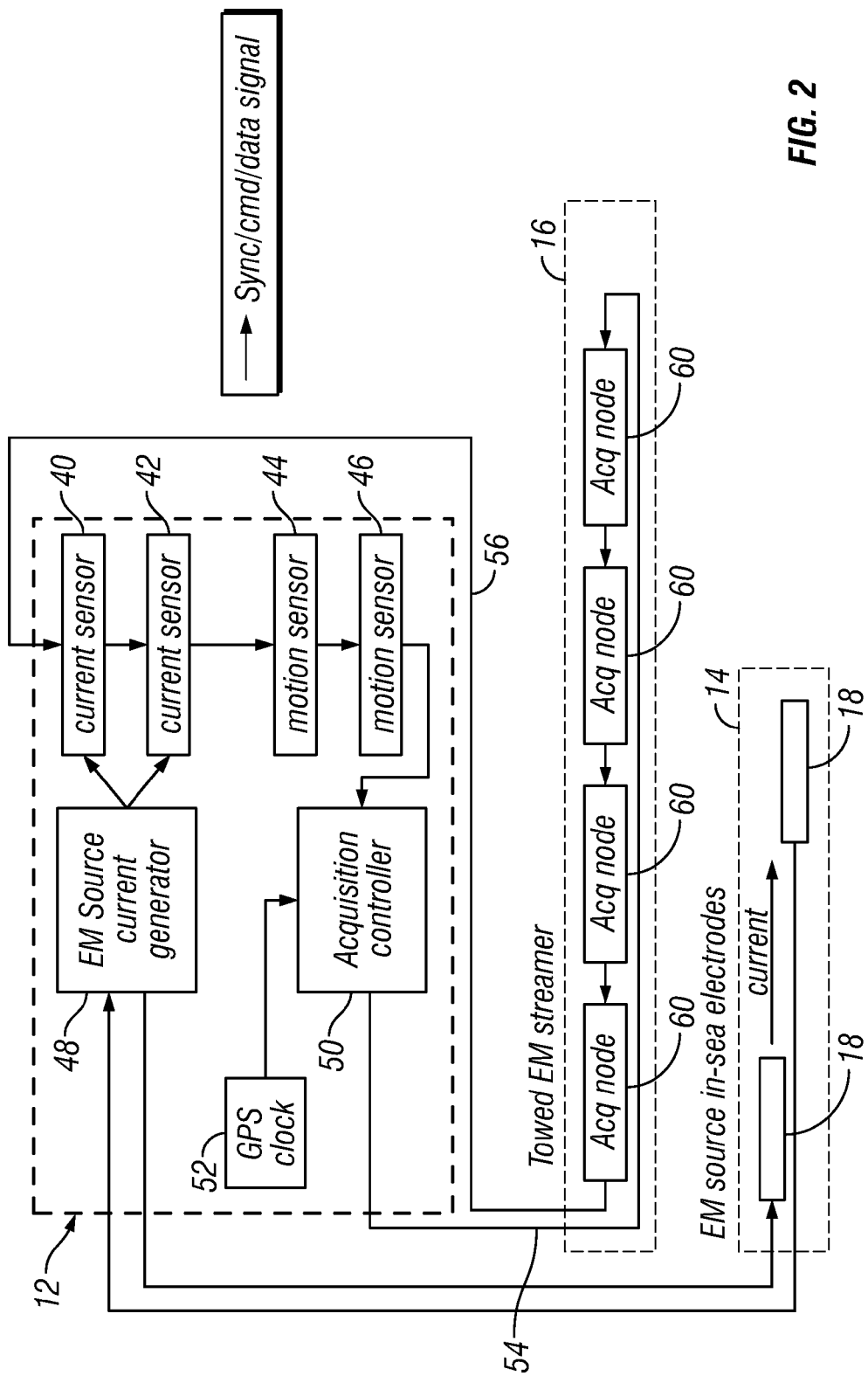
FIG. 2 shows an example embodiment of electromagnetic signal generation and recording devices that may form part of the recording system explained with reference to FIG. 1.
Figure 3:
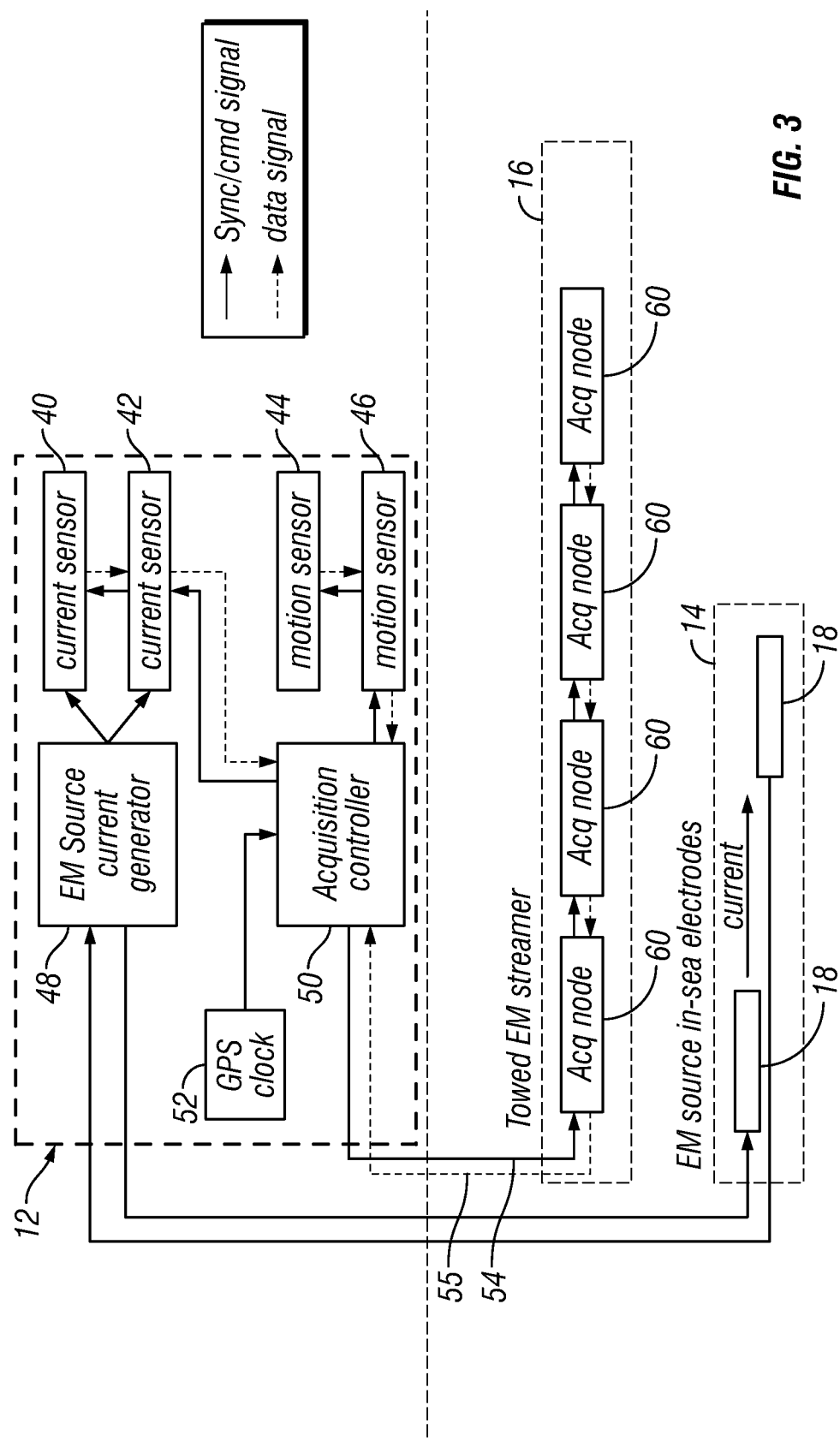
FIG. 3 shows another example embodiment of electromagnetic signal generation and recording devices.

The example embodiment shown in FIG. 2 provides that all the sensors in the acquisition system may be interrogated using a single command signal line 54 with an associated signal return line 56 in communication with all the sensors and acquisition nodes 60. In another example embodiment, shown in FIG. 3, a separate command signal line 54 and signal return line 55 may be used to obtain signals from the sensor cable 16. The on board current sensors 40, 42, and motion sensors 44, 46 may have separate provision for signal communication with the acquisition controller 50. Because acquisition of all signals may be performed by the same acquisition controller 50, the acquisition may be synchronized as accurately or more accurately as in the example embodiment shown in FIG. 2. Other components of the acquisition system shown in FIG. 3 may be substantially the same as those of the example embodiment of the acquisition system shown in FIG. 2.

Figure 4:
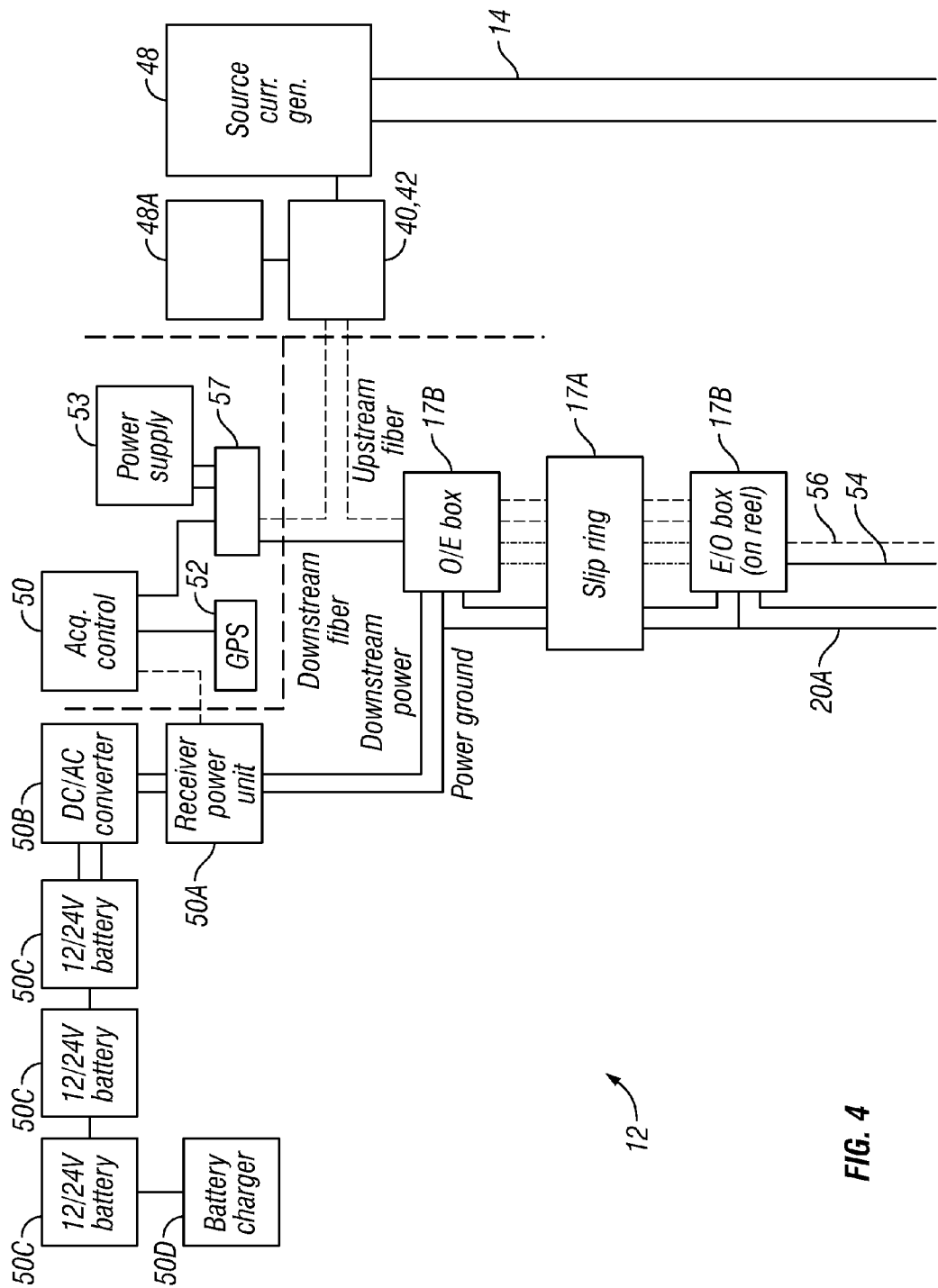
FIG. 4 shows another example embodiment of electromagnetic signal generation and recording devices.

A particular embodiment of equipment in the recording system 12 that may provide reduced noise in the detected signals from each of the sensors as well as reduced cross-coupling between sensor signals and between the sensor signals and the current imparted to the source cable (14 in FIG. 1) may be better understood with reference to FIG. 4. The acquisition controller 50 may be operated from its own power supply. In some embodiments, the power supply for acquisition controller 50 may consist of one or more storage batteries 50C, rechargeable by a battery charger 50D, a DC to AC converter 50B coupled to the storage batteries 50C and a power unit 50A coupled to the output of the DC to AC converter 50B. The power unit 50A may provide electric power to operate the acquisition controller 50 and the circuits (not shown) in the sensor cable (16 in FIG. 1). Acquisition command signals from the acquisition controller 50 may be conducted in electrical form to an optical signal transceiver 57. The optical signal transceiver 57 may include its own separate power supply 53 so that any variations in the power used to operate the acquisition controller 50 will not affect the signals generated by the optical signal transceiver 57. As explained with reference to FIG. 2, command signals from the acquisition controller 50 may be conducted to the sensor cable (16 in FIG. 1) using a command signal line 54. In the present embodiment, the command signal line may be one or more optical fibers. Signals returned from the various acquisition nodes (60 in FIG. 2) and on board current sensors (e.g., 40, 42 in FIG. 2) may be conducted to the acquisition controller 50 using a signal return line 56.

It will be appreciated by those skilled in the art that the sensor cable (16 in FIG. 1) may be deployed into the water using a winch or similar spooling device. Typically a winch or similar spooling device that extends and retracts cables having insulated electrical conductors and/or optical fibers will include a slip ring set 17A or similar device enabling relative rotation between the winch reel and rotationally fixed connections to the electrical conductors and/or optical fibers on the cable. In the present embodiment, the sensor cable (16 in FIG. 1) may use optical fibers, e.g., command signal line 54 and signal return line 56, for communication of command signals and sensor signals, and may use insulated electrical conductors 20A to transmit electrical power to the circuits (not show separately in FIG. 4) in the various components of the sensor cable (16 in FIG. 2). In the present embodiment, the winch may include optical to electrical converters 17B on both the rotating part of winch and on the rotationally fixed part, and in signal communication with the command signal line 54 and the signal return line 56. The optical to electrical converters 17B may enable signals to be transmitted in electrical form through the slip rings 17A, while being transmitted in optical form along the sensor cable (16 in FIG. 2) and in the recording system 12. Other embodiments may use optical slip rings for transmission of optical signals between the rotating and fixed parts of the winch In the present example embodiment, the source current generator 48 and associated current sensors 40, 42 may include their own separate power supply 48A. Such separate power supply 48A may be used to isolate the large current generated by the source current generator 48, so that the large current from the source current generator 48 may only minimally affect the other components of the recording system 12. Output of the source current generator 48 may be applied to the source cable 14 as explained with reference to FIG. 1.

Figure 5:
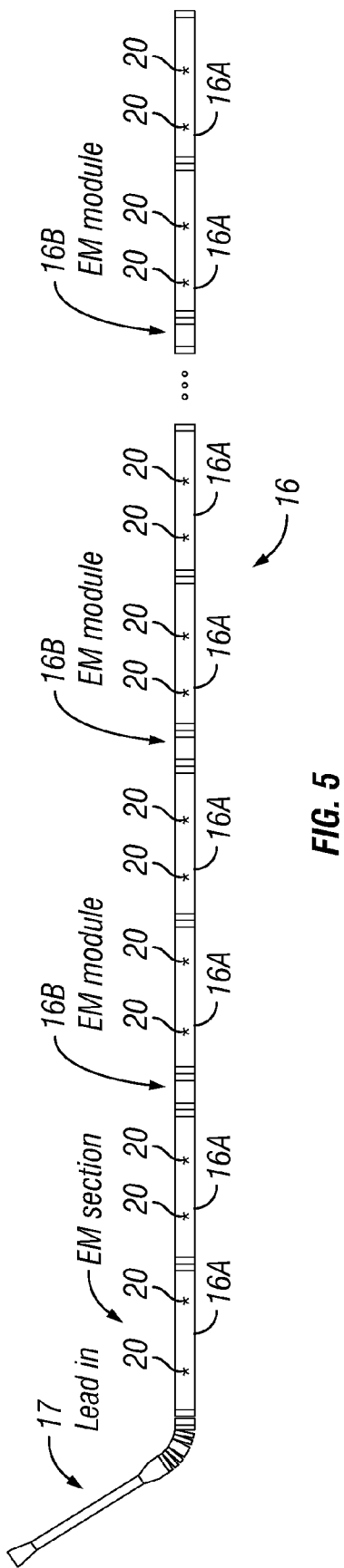
FIG. 5 shows an example embodiment of a sensor cable.

An example of a sensor cable 16 is shown schematically in FIG. 5. The sensor cable 16 may include a lead in 17 or similar device to enable towing by the survey vessel (10 in FIG. 1). The sensor cable 16 may be assembled from sensor segments 16A coupled end to end in pairs. Each pair of sensor segments 16A may be coupled to a succeeding pair of sensor segments 16A through a signal processing and configuration module 16B. The modules 16B may each contain one or more of the acquisition nodes (60 in FIG. 3). The sensor segments 16A may include suitable electromagnetic sensors 20 as explained with reference to FIG. 1. The motion sensors are omitted from FIG. 5 for clarity of the illustration.

Figure 6:
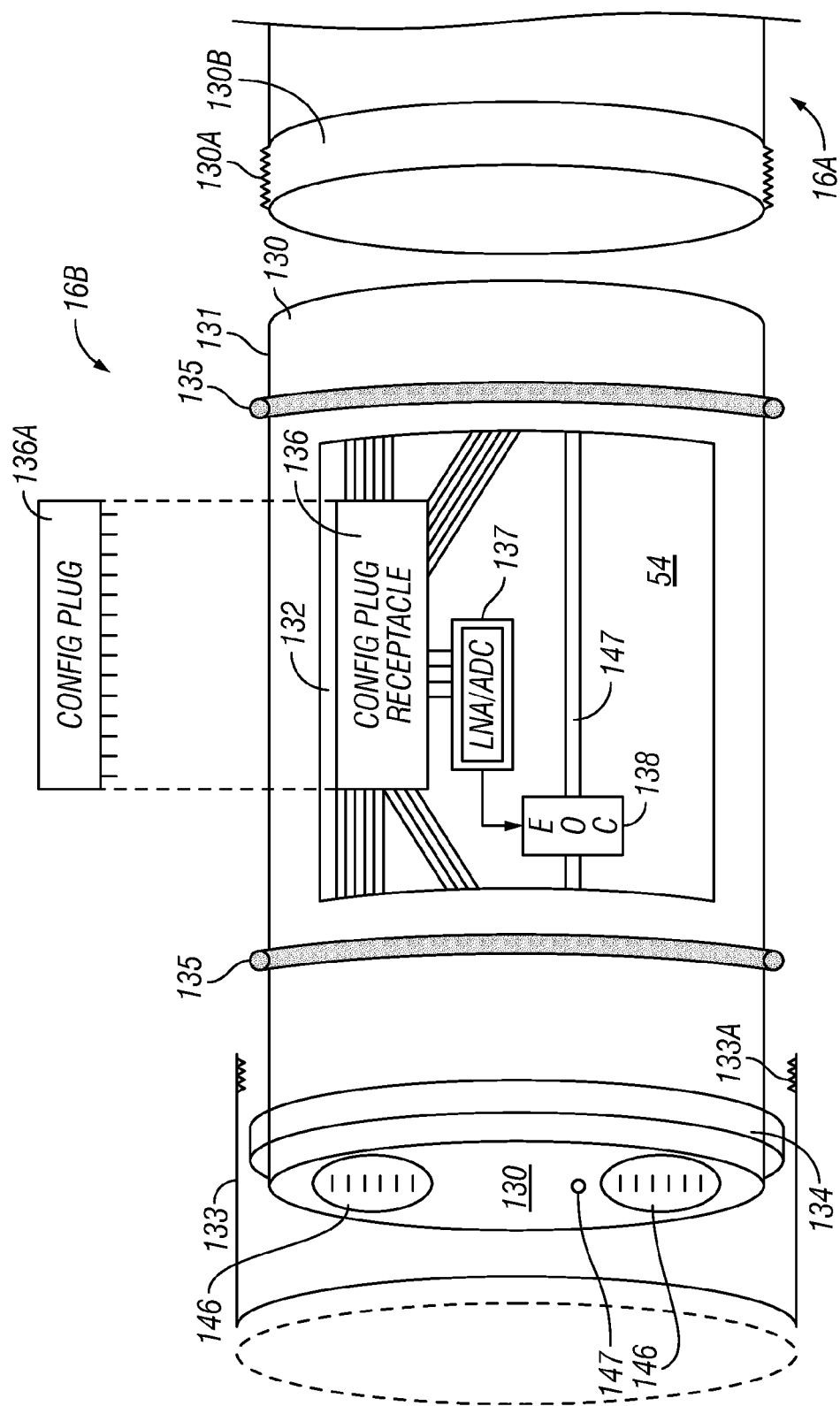
FIG. 6 shows an example embodiment of a signal processing and configuration module

An example embodiment of one of the signal processing and configuration modules 16B (hereinafter "module") is shown in cut away view in FIG. 6. The module 16B may be enclosed in a pressure resistant housing 131 such as may be made from high strength plastic or non-magnetic steel alloy. The housing 131 may be substantially cylindrically shaped, and may include electrical/mechanical terminations 130 configured to couple to the terminations 130B on a sensor segment 16A. The example embodiment shown in FIG. 6 may provide for such connection between cable segments by including a flange 134 on the exterior of the housing 131 which engages a mating flange (not shown) in a connecting sleeve 133. The connecting sleeve 133 may be substantially cylindrical in shape, and when moved along the exterior of the housing 131 may engage o-rings 135 or similar seal elements positioned longitudinally on either side of an opening 132 in the wall of the housing 131. Thus, with the sleeve 133 removed, the opening 132 is accessible. With the sleeve 133 in the connected position, for example, by engaging internal threads 133A on the end of the sleeve 133 with mating threads 130A on the adjacent termination 130B of sensor segment 16A, the interior of the housing 131 is sealed from water intrusion by the sleeve 133.

The interior of the housing 131 may include circuits for selective electrical interconnection of the various sensor segments 16A and connection of sensors on the sensor segments 16A to voltage or current measuring circuitry. In the present embodiment, each of the electrical connections 146 at each end of the housing 130 may be electrically connected, such as by twisted pairs of wires to a corresponding electrical contact on a configuration plug receptacle 136. Other electrical contacts on the configuration plug receptacle 136 may connect to the input terminals of one or more low noise amplifier/digitizer (LNA/ADC) combinations 137. Output of the combination(s) 137 may be coupled to an electrical to optical signal converter (EOC) 138 and thence to the one or more optical fibers 54 for communication of digitized voltage signals along the sensor cable and if required to the recording system (12 in FIG. 1). Power for the LNA/ADC 137 and EOC 138 may be provided by a battery (not shown) inside the module 16B. Such battery may be rechargeable while the sensor cable is deployed by using a module charging circuit such as one described in U.S. Pat. No. 7,602,191 issued to Davidsson, incorporated herein by reference.

The particular sensors on any sensor segment 16A located either toward the forward or aft end of the sensor cable (16 in FIG. 5) with respect to the module 16B that are connected to through wires or to the input of the LNA/ADC combination 137 may be selected prior to deployment of the sensor cable by inserting a suitably wired configuration plug 136A into the receptacle 136. Thus, in combination, suitable numbers of sensor segments 16A, and suitably configured modules 16B may provide the system user with a large number of options as to electrode spacing and offset while making only two basic sensor cable components.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for electromagnetic surveying, comprising:
   inducing an electromagnetic field in a body of water with a source current;
   detecting a property of the source current at selected times with a current sensor;
   detecting a property of an electromagnetic field in the body of water at selected time with an electromagnetic sensor;
   measuring motion of the electromagnetic sensor;
   measuring motion of a survey vessel including thereon a recording system for recording the detected property; and
   synchronizing the detecting the property of the source current, the detecting the property of the electromagnetic field, measuring motion of the electromagnetic sensor, and measuring motion of the survey vessel.

2. The method of claim 1, further comprising synchronizing the detecting the property of the source current and the detecting the property of the electromagnetic field with an absolute time reference.

3. The method of claim 2 wherein the absolute time reference signal is obtained by detecting a geodetic position signal.

4. The method of claim 1 wherein the inducing the electromagnetic field is synchronized with the detecting the property of the electromagnetic field, measuring motion of the electromagnetic sensor, and measuring motion of the survey vessel with an absolute time reference signal.

5. The method of claim 1 further comprising
   using the detected property of the source current and the detected property of the electromagnetic field to determine a response of subsurface formations present in the electromagnetic field.

6. The method of claim 1 further comprising determining a motion induced component of the detected property of the electromagnetic field using the measured motion of the electromagnetic sensor and measured motion of the survey vessel.

7. The method of claim 1 wherein the detected property of the electromagnetic field comprises at least one of electric field gradient and electric potential.

8. The method of claim 1 wherein the induced electromagnetic field comprises at least one of an alternating electromagnetic field and a transient electromagnetic field.

9. The method of claim 1 further comprising actuating the first source current generator in response to selected signals from the electromagnetic sensor.

* * * * *